US007927212B2

(12) United States Patent
Hedrick et al.

(10) Patent No.: US 7,927,212 B2
(45) Date of Patent: Apr. 19, 2011

(54) PLAYER TRACKING COMMUNICATION MECHANISMS IN A GAMING MACHINE

(75) Inventors: Joseph R. Hedrick, Reno, NV (US); Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 1115 days.

(21) Appl. No.: 10/903,024

(22) Filed: Jul. 30, 2004

(65) Prior Publication Data

US 2005/0003890 A1 Jan. 6, 2005

Related U.S. Application Data

(63) Continuation-in-part of application No. 09/921,489, filed on Aug. 3, 2001, now Pat. No. 6,908,387.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .................. 463/29; 273/138 A; 273/143 R; 273/138 R; 370/338; 463/26; 463/16; 463/42; 463/25; 455/3.06; 455/3.03; 455/142; 235/375

(58) Field of Classification Search ..................... 463/29
See application file for complete search history.

(56) References Cited

U.S. PATENT DOCUMENTS

| | | | |
|---|---|---|---|
| 4,669,730 | A | 6/1987 | Small |
| 5,129,652 | A | 7/1992 | Wilkinson |
| 5,206,495 | A | 4/1993 | Kreft |
| 5,318,298 | A | 6/1994 | Kelly et al. |
| 5,326,104 | A | 7/1994 | Pease et al. |
| 5,373,440 | A | 12/1994 | Cohen et al. |
| 5,429,361 | A | 7/1995 | Raven et al. |
| 5,643,086 | A | 7/1997 | Alcorn et al. |
| 5,655,961 | A | 8/1997 | Acres et al. |
| 5,702,304 | A | 12/1997 | Acres et al. |
| 5,722,891 | A | 3/1998 | Inoue |
| 5,735,742 | A | 4/1998 | French |
| 5,741,183 | A | 4/1998 | Acres et al. |
| 5,743,798 | A | 4/1998 | Adams et al. |

(Continued)

FOREIGN PATENT DOCUMENTS

| | | |
|---|---|---|
| AU | 199650576 | 4/1997 |

(Continued)

OTHER PUBLICATIONS

Joseph R. Hedrick et al., Player Tracking Communication Mechanisms in a Gaming Machine, Aug. 3, 2001, U.S. Patent Appln.

(Continued)

*Primary Examiner* — Paul A. D'Agostino
(74) *Attorney, Agent, or Firm* — Weaver Austin Villeneuve & Sampson LLP

(57) ABSTRACT

A disclosed player tracking unit provides a display, a wireless interface device designed or configured to communicate with a portable wireless headset, and a logic device designed or configured to communicate with the display, the wireless interface device, a master gaming controller that controls a game played on a gaming machine, and a player tracking server. The logic device can further communicate with the portable wireless headset using the wireless interface device. The portable wireless headset can include one or more ear-pieces configured to be worn by a player. Various messages, alerts, music, etc. can be sent from the player tracking unit to the portable wireless headset.

36 Claims, 7 Drawing Sheets

U.S. PATENT DOCUMENTS

| | | | | |
|---|---|---|---|---|
| 5,752,882 | A | 5/1998 | Acres et al. | |
| 5,761,647 | A | 6/1998 | Boushy | |
| 5,770,533 | A | 6/1998 | Franchi | |
| 5,809,482 | A | 9/1998 | Strisower | |
| 5,820,459 | A | 10/1998 | Acres et al. | |
| 5,833,540 | A | 11/1998 | Miodunski et al. | |
| 5,836,817 | A | 11/1998 | Acres et al. | |
| 5,838,384 | A * | 11/1998 | Schindler et al. | 348/563 |
| 5,851,149 | A | 12/1998 | Xidos et al. | |
| 5,876,284 | A | 3/1999 | Acres et al. | |
| 5,916,024 | A * | 6/1999 | Von Kohorn | 463/40 |
| 5,951,397 | A | 9/1999 | Dickinson | |
| 6,003,013 | A | 12/1999 | Boushy et al. | |
| 6,012,832 | A | 1/2000 | Saunders et al. | |
| 6,048,269 | A | 4/2000 | Burns et al. | |
| 6,048,271 | A | 4/2000 | Barcelou | |
| 6,089,975 | A | 7/2000 | Dunn | |
| 6,104,815 | A | 8/2000 | Alcorn et al. | |
| 6,106,396 | A | 8/2000 | Alcorn et al. | |
| 6,110,041 | A | 8/2000 | Walker et al. | |
| 6,113,495 | A | 9/2000 | Walker et al. | |
| 6,135,884 | A | 10/2000 | Hedrick et al. | |
| 6,135,887 | A | 10/2000 | Pease et al. | |
| 6,142,876 | A | 11/2000 | Cumbers | |
| 6,149,522 | A | 11/2000 | Alcorn et al. | |
| 6,161,762 | A | 12/2000 | Bashan et al. | |
| 6,162,122 | A | 12/2000 | Acres et al. | |
| 6,164,652 | A | 12/2000 | Lauretta et al. | |
| 6,168,084 | B1 | 1/2001 | Mish | |
| 6,168,521 | B1 | 1/2001 | Luciano et al. | |
| 6,174,234 | B1 | 1/2001 | Seibert, Jr. et al. | |
| 6,182,217 | B1 | 1/2001 | Sedlak | |
| 6,183,362 | B1 | 2/2001 | Boushy | |
| 6,186,893 | B1 | 2/2001 | Walker et al. | |
| 6,193,163 | B1 | 2/2001 | Fehrman et al. | |
| 6,195,712 | B1 | 2/2001 | Pawlowski et al. | |
| 6,202,932 | B1 | 3/2001 | Rapeli | |
| 6,210,279 | B1 | 4/2001 | Dickinson | |
| 6,230,029 | B1 * | 5/2001 | Hahn et al. | 455/575.2 |
| 6,238,288 | B1 | 5/2001 | Walker et al. | |
| 6,244,958 | B1 | 6/2001 | Acres | |
| 6,254,483 | B1 | 7/2001 | Acres | |
| 6,257,981 | B1 | 7/2001 | Acres et al. | |
| 6,264,560 | B1 | 7/2001 | Goldberg et al. | |
| 6,308,227 | B1 | 10/2001 | Kumar et al. | |
| 6,315,660 | B1 | 11/2001 | DeMar et al. | |
| 6,319,125 | B1 | 11/2001 | Acres | |
| 6,325,294 | B2 | 12/2001 | Tuttled et al. | |
| 6,343,988 | B1 | 2/2002 | Walker et al. | |
| 6,371,852 | B1 | 4/2002 | Acres | |
| 6,379,246 | B1 | 4/2002 | Dabrowski | |
| 6,398,649 | B1 | 6/2002 | Sugaya | |
| 6,409,595 | B1 | 6/2002 | Uihlein et al. | |
| 6,487,180 | B1 * | 11/2002 | Borgstahl et al. | 370/310 |
| 6,582,310 | B1 | 6/2003 | Walker et al. | |
| 6,587,835 | B1 * | 7/2003 | Treyz et al. | 705/14.64 |
| 6,629,591 | B1 | 10/2003 | Griswold et al. | |
| 6,638,170 | B1 | 10/2003 | Crumby | |
| 6,769,892 | B1 | 8/2004 | Brosnan | |
| 6,782,245 | B1 | 8/2004 | Lazzarotto et al. | |
| 6,814,665 | B2 | 11/2004 | Seelig et al. | |
| 6,857,021 | B1 * | 2/2005 | Schuster et al. | 709/227 |
| 6,866,586 | B2 | 3/2005 | Oberberger et al. | |
| 6,908,324 | B1 | 6/2005 | Morley et al. | |
| 6,908,387 | B2 | 6/2005 | Hedrick et al. | |
| 6,922,567 | B1 * | 7/2005 | Rydbeck | 455/456.3 |
| 6,970,602 | B1 | 11/2005 | Smith et al. | |
| 6,987,947 | B2 * | 1/2006 | Richenstein et al. | 455/3.06 |
| 7,032,115 | B2 | 4/2006 | Kashani | |
| 7,203,665 | B2 * | 4/2007 | Donner | 705/64 |
| 7,231,380 | B1 * | 6/2007 | Pienkos | 1/1 |
| 7,280,975 | B1 * | 10/2007 | Donner | 705/10 |
| 2001/0010689 | A1 | 8/2001 | Awater et al. | |
| 2001/0049775 | A1 | 12/2001 | Rechberger et al. | |
| 2002/0042296 | A1 | 4/2002 | Walker et al. | |
| 2002/0047044 | A1 | 4/2002 | Orus et al. | |
| 2002/0052239 | A1 | 5/2002 | Finn | |
| 2002/0080967 | A1 | 6/2002 | Abdo et al. | |
| 2002/0107066 | A1 | 8/2002 | Seeling et al. | |
| 2002/0149470 | A1 * | 10/2002 | Mynatt et al. | 340/10.1 |
| 2002/0167406 | A1 | 11/2002 | Garber et al. | |
| 2002/0174336 | A1 | 11/2002 | Sakakibara et al. | |
| 2002/0187828 | A1 | 12/2002 | Benbrahim | |
| 2002/0194619 | A1 | 12/2002 | Chang et al. | |
| 2003/0003997 | A1 | 1/2003 | Vuong et al. | |
| 2003/0017871 | A1 | 1/2003 | Urie et al. | |
| 2003/0040960 | A1 | 2/2003 | Eckmann | |
| 2003/0043771 | A1 | 3/2003 | Mizutani et al. | |
| 2003/0064805 | A1 * | 4/2003 | Wells | 463/39 |
| 2003/0067389 | A1 | 4/2003 | Look | |
| 2003/0095525 | A1 * | 5/2003 | Lavin et al. | 370/338 |
| 2003/0119575 | A1 | 6/2003 | Centuori et al. | |
| 2003/0125973 | A1 | 7/2003 | Mathews et al. | |
| 2003/0176218 | A1 | 9/2003 | LeMay et al. | |
| 2004/0025594 | A1 | 2/2004 | Broden et al. | |
| 2004/0137978 | A1 | 7/2004 | Cole et al. | |
| 2005/0003890 | A1 | 1/2005 | Hedrick | |
| 2005/0069101 | A1 * | 3/2005 | Bear et al. | 379/88.17 |
| 2005/0113172 | A1 | 5/2005 | Gong | |
| 2005/0116020 | A1 * | 6/2005 | Smolucha et al. | 235/375 |
| 2005/0136949 | A1 * | 6/2005 | Barnes | 455/461 |
| 2005/0154823 | A1 * | 7/2005 | Bruner et al. | 711/112 |
| 2005/0187012 | A1 | 8/2005 | Walker et al. | |
| 2006/0126861 | A1 * | 6/2006 | Saliterman | 381/77 |
| 2006/0173781 | A1 * | 8/2006 | Donner | 705/50 |
| 2006/0188118 | A1 * | 8/2006 | Berger et al. | 381/315 |
| 2007/0087810 | A1 * | 4/2007 | Walker et al. | 463/16 |
| 2007/0242834 | A1 * | 10/2007 | Coutinho et al. | 381/71.8 |
| 2007/0287516 | A1 * | 12/2007 | Cheung et al. | 455/575.6 |
| 2008/0254886 | A1 | 10/2008 | Kelly | |

FOREIGN PATENT DOCUMENTS

| | | | |
|---|---|---|---|
| AU | 200030185 | | 11/2000 |
| CA | 2442442 | | 10/1995 |
| CA | 2151990 | | 12/1995 |
| EP | 0360613 | | 3/1990 |
| EP | 0 769 769 | | 4/1997 |
| EP | 1096438 | A2 | 2/2001 |
| WO | WO 96/09100 | | 3/1996 |
| WO | WO 96/12262 | | 4/1996 |
| WO | WO 98/12648 | | 3/1998 |
| WO | WO 00/78419 | | 12/2000 |
| WO | WO0217251 | | 2/2002 |
| WO | WO0224288 | | 3/2002 |
| WO | WO 2004/025594 | | 3/2004 |
| WO | WO 2004/025594 | A1 | 3/2004 |

OTHER PUBLICATIONS

Rick Rowe et al., Cashless Transaction Clearinghouse, Nov. 16, 2001, U.S. Appl. No. 09/993,163.

Steven G. LeMay et al., Game Development Architecture that Decouples the Game Logic from the Graphics Logic, Jan. 1, 2002, U.S. Appl. No. 10/040,239.

Binh T. Nguyen et al., Secured Virtual Network in a Gaming Environment, Apr. 3, 2002, U.S. Appl. No. 10/116,424.

William R. Brosnan et al., Identifying Message Senders, Nov. 7, 2002, U.S. Appl. No. 10/291,926.

Rex Y. Lam, et al., Usb Software Architecture in a Gaming Machine, Jun. 11, 2003, U.S. Appl. No. 10/460,822.

Robert Silva et al., Wireless Input/Output and Peripheral Devices on a Gaming Machine, Sep. 11, 2003, U.S. Appl. No. 10/661,404.

Erasala N et al: "Bluetooth technology: a strategic analysis of its role in global 3G wireless communication era" Computer Standards and Interfaces, Elsevier Sequoia. Lusanne, CH, vol. 24, No. 3, Jul. 2002, pp. 193-206, XP004360409, ISSN: 0920-5489 the whole document.

Marshall Fey, Slot Machines, A Pictorial History of the First 100 years, 1983, Liberty Belle Books, pp. 100-117.

Charny et al., "Magnets attracting wireless attention", CNET News.com, http://www.news.com, Sep. 19, 2003, pp. 1-2.

"Leading-edge smart card technology meets smartest watch technology"; Business News from Philips Semiconductors, E/BN-1148/60, Aug. 29, 2000.

Wells, et al. 21 page document entitled "Gaming Terminal And System With Biometric Identification", IGT, U.S. Appl. No. 09/491,899/ P-220.

Office Action dated Sep. 11, 2008 from U.S. Appl. No. 11/094,943.
Office Action dated Dec. 5, 2008 from Australian Patent Application No. 2003273319.
Office Action dated Jan. 8, 2009 from U.S. Appl. No. 11/471,352.
Office Action dated Jan. 8, 2009 from U.S. Appl. No. 11/829,718.
Examination Report dated Feb. 2, 2009 from related Australian Application No. 2003267167.
Decision to Refuse dated Feb. 23, 2009 from related European Application No. 03755819.4.
Office Action dated Aug. 11, 2008 from U.S. Appl. No. 10/661,404, 9 pgs.
Office Action dated Mar. 27, 2009 from U.S. Appl. No. 11/094,943.
Examination Report dated Apr. 29, 2009 from European Patent Application No. 06739913.9.
Office Action dated May 27, 2009 from U.S. Appl. No. 10/661,404.
Final Office Action dated Jun. 4, 2009 from U.S. Appl. No. 11/471,352.
Office Action dated Mar. 13, 2009 from Chinese Patent Application No. 2006800110753.
Statement of Grounds and Particulars dated May 15, 1009 from Australian Patent Application No. 2002329644.
Statement of Grounds dated Jun. 30, 2009 from European Patent Application No. 03755819.4.
Final Office Action dated Aug. 31, 2009 from U.S. Appl. No. 11/829,718.
Final Office Action dated Oct. 2, 2009 from U.S. Appl. No. 11/094,943.
Final Office Action dated Dec. 21, 2009 from U.S. Appl. No. 10/661,404.
Final Office Action dated Jan. 8, 2010 from U.S. Appl. No. 11/471,352.
Office Action dated Dec. 23, 2009 from Australian Patent Application No. 2003273319.
Office Action dated Feb. 22, 2010 from U.S. Appl. No. 11/094,943.
Second Office Action dated Feb. 5, 2010 from Chinese Patent Application No. 2006800110753.
Examination Report dated Apr. 20, 2010 from Australian Patent Application No. 2005267865.
Final Office Action dated Aug. 5, 2010 from U.S. Appl. No. 11/094,943.
Office Action dated Aug. 3, 2010 from U.S. Appl. No. 11/471,352.
Office Action dated Sep. 9, 2010 from U.S. Appl. No. 10/661,404.
Examination Report dated Sep. 20, 2010 from Australian Patent Application No. 2006230257.

* cited by examiner

PRIOR ART

PLAYER TRACKING COMMUNICATION MECHANISMS IN A GAMING MACHINE

CROSS-REFERENCE TO RELATED APPLICATIONS

This application is a continuation-in-part of and claims priority from U.S. patent application Ser. No. 09/921,489 entitled "PLAYER TRACKING COMMUNICATION MECHANISMS IN A GAMING MACHINE," by Hedrick et al., filed on Aug. 3, 2001, now U.S. Pat. No. 6,908,387 which is incorporated by reference herein in its entirety for all purposes.

BACKGROUND OF THE INVENTION

This invention relates to game playing methods for gaming machines such as video slot machines and video poker machines. More particularly, the present invention relates to methods and apparatus for providing communications between a gaming machine and a player, using a player tracking unit.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server. Player tracking units are usually manufactured as an after-market device separate from the gaming machine. Many different companies manufacture player tracking units as part of player tracking/accounting systems. These player tracking/accounting systems are used in most casinos. Most casinos utilize only one type of player tracking system (i.e. from one manufacturer) while the type of player tracking system varies from casino to casino.

An example of a hardware and/or software implementation of a player tracking system with respect to a number of gaming machines is described as follows. FIG. 1 is a block diagram of a number of gaming machines with player tracking units connected to servers providing player tracking services. In casino 150, gaming machines 100, 101, 102 and 103 are connected, via the data collection unit (DCU) 106 to the player tracking/accounting server 120. The DCU 106, which may be connected to up to 32 player tracking units as part of a local network in a particular example, consolidates the information gathered from player tracking units in gaming machines 100, 101, 102 and 103 and forwards the information to the player tracking account server 120. The player tracking account server is designed 1) to store player tracking account information, such as information regarding a player's previous game play, and 2) to calculate player tracking points based on a player's game play that may be used as basis for providing rewards to the player.

In gaming machine 100 of casino 150, a player tracking unit 107 and slot machine interface board (SMIB) 105 are mounted within a main cabinet 8 of the gaming machine. A top box 6 is mounted on top of the main cabinet 8 of the gaming machine. In many types of gaming machines, the player tracking unit is mounted within the top box 6. Usually, player tracking units, such as 107, and SMIBs, such as 105, are manufactured as separate units before installation into a gaming machine, such as 100.

The player tracking unit 107 includes three player tracking devices, a card reader 24, a key pad 22, and a display 16, all mounted within the unit. The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush or at a slight angle upward with a horizontal in a flat top gaming machine.

The player tracking unit 107 communicates with the player tracking server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking server 120 to calculate player tracking points for the player. The player tracking unit 107 is usually connected to the master gaming controller 104 via a serial connection using a wire serial connector and communicates with the master gaming controller 104 using a serial communication protocol. The serial connection between the SMIB 105 and the master gaming controller 104 may be through the main communication board 110, through another intermediate device or through a direct connection to the master gaming controller 104. In general, communication between the various gaming devices is provided using wire connectors with proprietary communication protocols. As an example of a proprietary serial communication protocol, the master gaming controller 104 may employ a subset of the Slot Accounting System (SAS protocol) developed by International Game Technology of Reno, Nev. to communicate with the player tracking unit 107.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 107 may detect this event and receive certain identification information contained on the card. For example, a player's name, address, and player tracking account number encoded on the magnetic striped card, may be received by the player tracking unit 107. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

After a player has inserted her or his player tracking card into the card reader 24, the player tracking unit 107 may command the display 16 to display the game player's name on the display 16 and also, may optionally display a message requesting the game player to validate their identity by entering an identification code using the key pad 22. Once the game player's identity has been validated, the player tracking information is relayed to the player tracking server 120. Typically, the player tracking server 120 stores player tracking account records including the number of player tracking points previously accumulated by the player.

During game play on the gaming machine, the player tracking unit 107 may poll the master gaming controller 104 for game play information such as how much money the player has wagered on each game, the time when each game was initiated and the location of the gaming machine. The game play information is sent by the player tracking unit 107 to the player tracking server 120. While a player tracking card is inserted in the card reader 24, the player tracking server 120 may use the game play information provided by the player tracking unit 107 to generate player tracking points and add the points to a player tracking account identified by the player tracking card. The player tracking points generated by the player tracking server 120 are stored in a memory of some type on the player tracking server.

As suggested above, a player's incentive for using the player tracking services is awards provided by the gaming machine operator (e.g., the casino). Some incentives of a casino for providing player tracking services is to generate "brand" loyalty, gather valuable information that may be used for marketing and provide better customer services. Unfortunately, when player tracking identification information is not provided to the player tracking server 120 via the player tracking unit 107, player tracking points are not accrued for a game player participating in a game play session on gaming machine 100. For example, when a player tracking card is not inserted into the card reader 24, the player tracking card has been inserted incorrectly or the card reader is malfunctioning, or the game player does not have a player tracking card, a game player may not obtain player tracking points while participating in game play on gaming machine 100. This happens more frequently than one might imagine and may be discouraging to the player.

Player tracking cards and player tracking programs are becoming more and more popular. They have become a de facto marketing method of doing business at casinos. The programs allow a casino to identify and reward customers based upon their previous game play history. In particular, a goal of the casinos is to identify and then to provide a higher level of service to certain groups of players identified as especially valuable to the casinos. For instance, players that visit the casino, on average, once a week may be deemed as "special" customers and the casino may desire to cultivate a "special" relationship with these customers. As indicated, a disadvantage of current player tracking programs using player tracking cards is that a game player may simply forget to bring her card, forget to insert it into the gaming machine, insert the card incorrectly into the card reader or not may not have a card. In each of these cases, the player will fail to earn player tracking points and the player is deprived of awards that would otherwise be provided. Further, the casino is deprived of valuable marketing information and is unable to provide loyalty incentives. In addition, the casino is unable to cultivate a special relationship with the player because their playing attributes remain unknown. Thus, in view of the above, it would be desirable to provide apparatus and methods for player tracking programs that allow both casinos and players to avoid and correct errors resulting from incorrect use of a player tracking system and that allow a casino to better serve "special" players.

SUMMARY OF THE INVENTION

This invention addresses the needs indicated above by providing a player tracking unit with a wireless interface device. According to various embodiments, the wireless interface device is designed or configured to allow player tracking information to be automatically downloaded from a portable wireless device carried by the player or player status information to be communicated to a casino service representative carrying a portable wireless device. Furthermore, in some embodiments, the portable wireless device can be a portable wireless headset that can allow one-directional or two-directional communications between a gaming machine and a player.

One aspect of the present invention provides a player tracking unit. The player tracking unit may be generally characterized as including: A player tracking unit comprising: a display; a wireless interface device designed or configured to communicate with a portable wireless headset; and a logic device designed or configured to communicate with the display, the wireless interface device, a master gaming controller that controls a game played on a gaming machine and a player tracking server. The logic device can communicate with the portable wireless headset using the wireless interface device.

Another aspect of the present invention provides a gaming machine. The gaming machine may be generally characterized as including: a master gaming controller designed or configured to control one or more games played on the gaming machine; and a player tracking unit. The player tracking unit can include a display; a wireless interface device designed or configured to communicate with a portable wireless headset; and a logic device designed or configured to communicate with the display, the wireless interface device, the master gaming controller, and a player tracking server. The logic device can also communicate with the portable wireless headset using the wireless interface device.

Yet another aspect of the present invention provides a player tracking system. The player tracking system may be generally characterized as including: a player tracking server; a plurality of gaming machines; and a network designed or configured to allow communication between the plurality of gaming machines and the player tracking server. The gaming machines can each include a master gaming controller designed or configured to control one or more games played on the gaming machine; and a player tracking unit. The player tracking unit can include a display; a wireless interface device designed or configured to communicate with a portable wireless headset; and a logic device designed or configured to communicate with the display, the wireless interface device, the master gaming controller, and a player tracking server, wherein the logic device can communicate with the portable wireless device using the wireless interface device.

These and other features and advantages of the invention will be spelled out in more detail below with reference to the associated drawings.

DESCRIPTION OF THE PREFERRED EMBODIMENTS

Figure 2A:
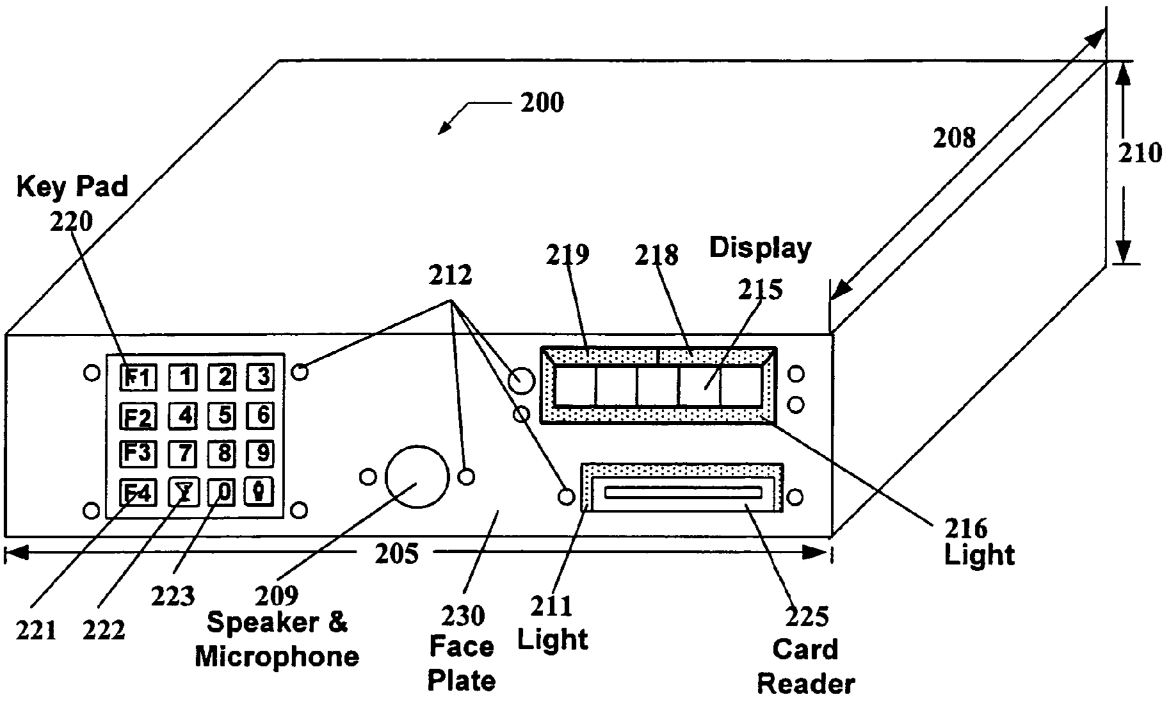
FIGS. 2A and 2C are perspective diagrams of a player tracking units of the present invention.
Figure 2B:
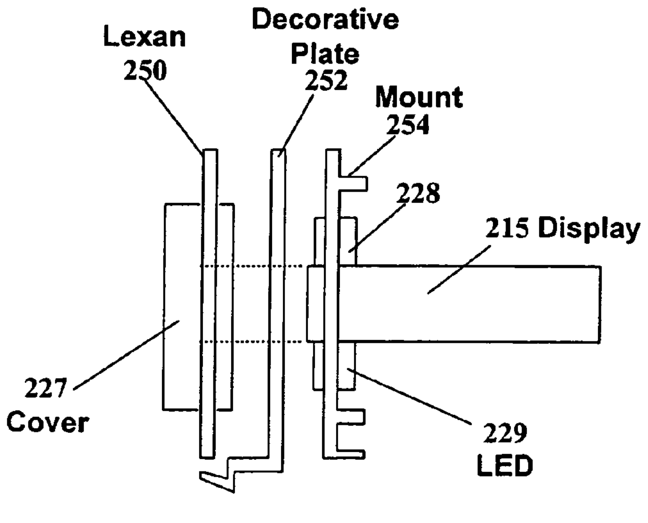
FIG. 2B is a mounting system for attaching an interface peripheral used as a player tracking device to a player tracking unit of the present invention.
Figure 2C:
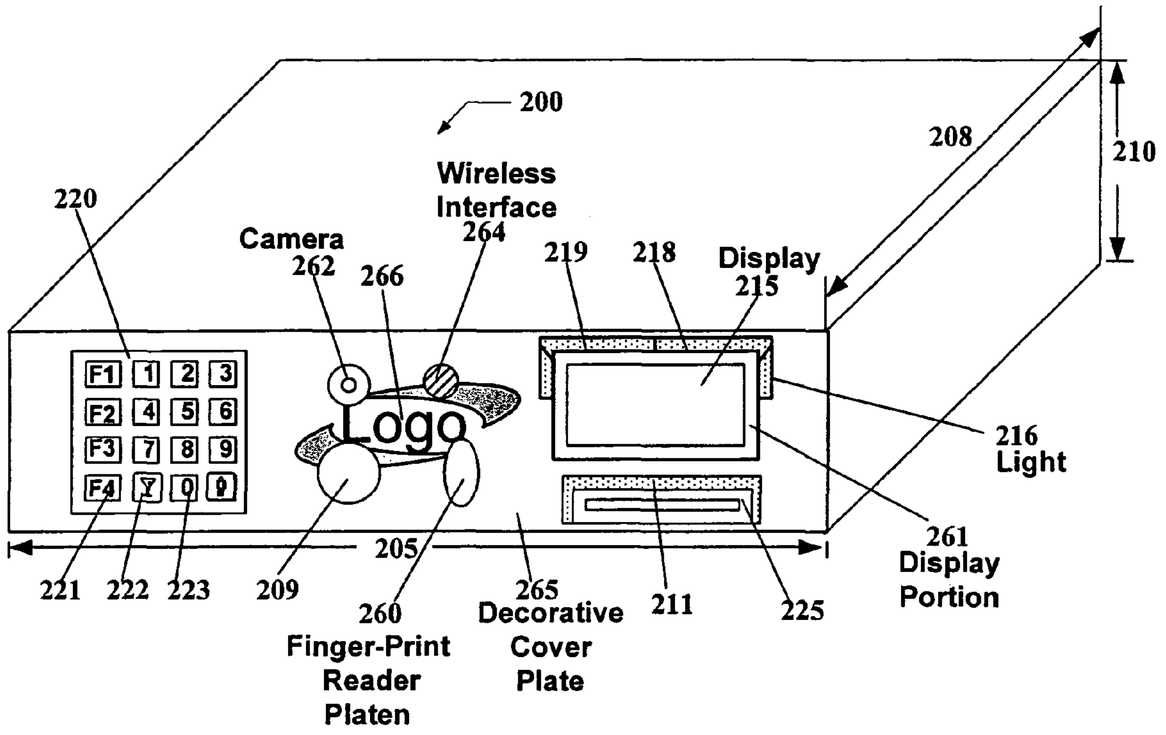

FIGS. 2A and 2C are perspective diagrams of different embodiments of player tracking units of the present invention. FIG. 2B is a mounting system for attaching a player tracking device to a player tracking unit of the present invention. FIG. 2A is a front diagram for a housing or chassis 200 enclosing a number of interface peripherals. The interface peripherals may be used to provide input and output (I/O) to a player tracking system or may be used to provide I/O to other gaming systems such as a gaming machine. The device housing 200 may enclose a logic device (not shown) and other electronics configured to execute player tracking functions or the logic device may be enclosed in a logic device housing separate from the device housing 200.

Using the player tracking interface devices enclosed in the housing 200, gaming information, such as player tracking information, may be input to the player tracking unit and gaming information may be visually and aurally communicated to various individuals that may use the player tracking unit, such as game players, casino service representatives and maintenance technicians. Aspects of the present invention involve using illumination devices, such as back lit key pad buttons (e.g. 221, 222 and 223), light 211 and light 216 and sound projection devices, such as speaker 209, to visually and/or aurally communicate game information. The function buttons, F1, F2, F3 and F4 (i.e. 221) may be used to provide various services through the player tracking unit. Thus, in the following paragraphs, player tracking device hardware, its integration into the device housing 200 and methods for visually and aurally communicating gaming information using the hardware devices, are described.

The device housing 200 encloses a display 215, a key pad 220, a microphone 207, a speaker 209, a card reader 225, a light 216 adjacent to the card reader 225 and a light 216 adjacent to the display 215. In other embodiments, the housing 200 may enclose many different combinations of player tracking interface devices. For instance, additional gaming devices, such as biometric input devices, wireless interface devices, cameras and bonus buttons, may also be enclosed in the device housing (see FIG. 2C). In one embodiment, face plate 230 surrounds the display 215, the key pad 220, the card reader 225, the light 216, the light 211, the microphone 207 and the speaker 209. The face plate 230 may include mounting holes, such as 212, for mounting various player tracking interface devices to the face plate 230 such as the display 215 (see FIG. 2B).

The face plate 230 includes cut-outs (not shown) that may allow access to the player tracking interface devices. For instance, a front portion of the light 216, a front portion of the display 215, and a front portion of the key pad are visible through the face plate 230. Each of the key pad buttons, such as 221, 222 and 223, may be back-lit by illumination devices of some type. The illumination devices, behind the key pad buttons, may be independently controlled to display various light and color patterns. The light and color patterns may be used to represent game information. Details of a back-lit key pad used to convey gaming information are described in co-pending U.S. application Ser. No. 09/476,143, filed Jan. 3, 2000, by Powell et al., entitled, "A MICROCONTROLLED BACKLIT KEYPAD ASSEMBLY AND METHOD FOR A GAMING MACHINE" which is incorporated herein in its entirety and for all purposes.

The dimensions of the device housing 200, (e.g. 205, 208 and 210) are shown in FIGS. 2A and 2C. The device housing 200 is shown as a rectangular box for illustrative purposes only. A shape of the device housing 200 is variable and is not strictly limited to rectangular shapes. Further, dimensions of the cut-outs on the face plate 230 for the player tracking interface devices may vary depending the manufacturer of a particular interface peripheral device which may be used in a player tracking device. Typically, the dimensions of player tracking interface devices vary from manufacturer to manufacturer.

The light 216, adjacent to the display 215 may use one or more illumination devices. Further, the light 216 may employ one or more types of lighting systems such as light emitting diodes (LED's), neon bulbs, incandescent bulbs, halogen bulbs, florescent bulbs, electro-luminescent lighting elements or combination thereof In a particular embodiment, the LED's may be multi-colored LED's. Details of providing electro-luminescent lighting elements to convey gaming information on a player tracking unit are described in co-pending U.S. provisional application, filed May 4, 2001, by Winans, and entitled, "PLAYER TRACKING PANEL," which is incorporated herein in its entirety and for all purposes.

The light 216 may include a translucent cover 227 with different segments, such as 218 and 219. The cover 227 and cover segments 218 and 219 may be colored in some manner. For instance, cover segments 218 may be red and cover segment 219 may be blue while the remaining cover may be clear. The cover may be manufactured from a translucent plastic material. The cover segments 218 and 219 may protrude above the surface of face plate 230 to increase visibility of the light 216. The translucent cover may vary in shape. Depending on the lighting system used, the translucent cover may be removable to allow replacement of a defective bulb or other lighting system element.

The translucent cover 227 with cover segments 218 and 219, may enclose one or more illumination devices. For instance, cover segment 219 may enclose a plurality of LED's while cover segment 218 may enclose a neon bulb. The illumination of each of the illumination devices may be independently controlled by electronics (see FIG. 3) located within the device housing 200. The translucent cover may extend substantially surround the display 215 or the translucent cover may extend around a portion of the perimeter of the display 215 (see FIG. 2C). The display 215 may be an LED, LCD, vacuum florescent, plasma display screen or any other type of display technology.

The location of the illumination devices within light 216 may be used to indicate different types of gaming information. In one embodiment, illumination devices located below cover segment 219 may be operated in some manner to visually communicate player status information while illumination devices located below cover segment 218 may be used to indicated card status information for a card inserted in the card reader 225. For instance, for an especially valued customer, cover segment 219 may be illuminated in a shade of green while cover segment 218 remains unilluminated. As another example, when a card is inserted incorrectly in the card reader 225, such as the card is inserted up-side down, cover segment 218 may be illuminated with a flashing red pattern while cover segment 219 remains unilluminated. In some embodiments, depending on the type of gaming information being displayed, two or more illumination devices on light 216 may be illuminated simultaneously where each of the illumination devices is used to convey a different type of gaming information. For instance, a first illumination device may be illuminated in some manner to visually communicate player status information, while a second illumination device may be used to communicate card status information and while a third illumination device may be used to communicate an error condition on the player tracking unit where combinations of two or more of the illumination devices may be illuminated at the same time.

FIGS. 2B is a mounting system for attaching a display 215 to a device housing 200 for one embodiment the present invention. Many mounting systems may be used with the present invention and the example in FIG. 2B is provided for illustrative purposes only. The display 215 and LED's, 228 and 229, are attached to the mount 254 which is secured with a decorative plate 252 to a decorative skin 250 of polycarbonate plastic material. Typically, the decorative skin 250 is silk-screened to add a particular graphic design. In some embodiments, the LED's or other illumination devices of the present invention may also be secured to the display 215. The cover 227 for the illumination devices 228 and 229 is shown protruding through and above the decorative skin 250. Attachment means are used to secure the display 215 to the mount 254 and/or the device housing 200. Attachment means (not shown) are also used to secure the other player tracking interface devices, such as the card reader 225, the key pad 220, the microphone 207 and the speaker 209 to the device housing 300.

FIG. 2C is a front diagram for a housing or chassis 200 enclosing a number of interface peripherals which may be used as player tracking interface devices, for one embodiment of the present invention. The front plate 230 is covered with a decorative skin 265 with a silk-screen logo 266. In addition to the player tracking interface devices described with respect to FIG. 2A, the player tracking housing 200 includes a wireless interface 264, a camera 262 and a finger-print reader with platen 260.

The display 215 is a color LCD. Other display technologies such as organic electro-luminescent devices may be used with the display 215. A portion of the LCD 215 may be used at times to visually convey gaming information as described in regards to light 216. For instance, a border region 261 around the perimeter of the display may flash green to indicate a player has requested a drink. In this embodiment, the light 216 surrounds a top portion of the display 215 and parts of the side of display 215. In another embodiment, the light 216 may be located across the top portion of the display 215.

The camera 262 may be used for security purposes, promotional purposes and to enter biometric information. For instance, the camera 262 may deter tampering with a player tracking unit or gaming machine. As another example, a picture of a player may be recorded when they win a jackpot and used for a promotion. As another example, the camera may be used with feature recognition software to identify the player. Similarly, the finger-print reader 260 may be used to read a player's fingerprint which is used to determine their identity. As. another example, the microphone 207 may be used with voice recognition software to recognize a player's voice for player authentication purposes. Thus, a voice signal input into the microphone 207 may be compared with a stored voice print to identify the player. In some embodiments, biometric input devices may be used to supplement information read from a card inserted in the card reader or to even replace the card reader 225. A description of a finger print reader as an identification device is provided in co-pending U.S. application Ser. No. 09/172,787, filed Oct. 14, 1998, by Wells, et al., entitled "Gaming Device Identification method and Apparatus," which is incorporated herein in its entirety and for all purposes.

The wireless interface 264 may be used to communicate with a portable wireless device worn or carried by a player, a casino service representative or maintenance technician. For example, rather than inserting a card into the card reader 225, a player may wear or simply carry a wireless communication device that may be about the size of a player tracking card. When the player is near the machine, a wireless interface device 264 and the wireless device worn by the player may automatically detect each other establish communications allowing gaming information to be transferred between the wireless devices.

In another example, the portable wireless device can be a portable wireless headset. This headset can be worn by a player, and can allow communications between the gaming machine and the player. In some embodiments, the portable wireless headset can include one or more earpieces that can be worn by the player. The earpieces can be coupled to a headband or can be stand-alone pieces that can be worn on, in, or near the ear. Other configurations of earpieces are also possible, such as earpieces that are coupled to each other with a wire, and the like. Furthermore, the portable wireless headset can include a noise cancellation feature that reduces the amount of ambient noise detectable when the portable wireless headset is used. The portable wireless headset can include an antenna for transmitting and/or receiving wireless communications to and/or from the wireless interface device of a player tracking unit. In addition, the wireless interface device can also include an antenna for transmitting and/or receiving wireless communications.

Various types of communications can be transmitted between the player tracking unit and the portable wireless headset. For instance, a player tracking unit may send security alerts to a portable wireless headset via the wireless interface device. These security alerts may inform a player about attempted accesses to his or her player tracking account, or the like. In addition, these security alerts can include emergency broadcast signals that may be transmitted in the event of a fire alarm, evacuation, or the like. Especially when noise cancellation technology is used with the headsets, such emergency broadcast signals may be useful to inform players of a particular situation in a gaming establishment.

In another example, a player tracking unit may send messages to a portable wireless headset via the wireless interface device, such that a player can receive the messages when in proximity to the player tracking unit. The messages may include reminders, special offers, or promotions. The reminders, special offers, or promotions can be based on information associated with the player's player tracking account. For instance, if the player received a complementary buffet dinner via a player tracking account, the player tracking unit may provide a reminder to the player as the dinner period begins. In other applications, a player may set his or her own reminders via the player tracking unit. Furthermore, the player tracking unit may provide special offers to the player based on the length of play, time of day, randomly, etc. These special offers or promotions may be provided during game play or as an advertisement or teaser when a player is in proximity to a particular gaming machine to entice the player to engage in game play.

In yet another example, the player tracking unit may transmit music to the portable wireless headset via the wireless interface device, such that a player can listen to music when in proximity to the player tracking unit. For instance, a player can select a particular type of music or a playlist that he or she would like to listen to during game play or when otherwise in proximity to a gaming machine. If the player has not selected a particular type of music or a playlist, a default music selection can be transmitted to the portable wireless headset in some applications.

In some embodiments, the portable wireless headset includes a microphone. Data, such as voice commands, and the like, received by the microphone can be transmitted from the portable wireless headset to the wireless interface device. This data can then be transmitted to a logic device, which can recognize and execute this data. The player tracking unit may also include a memory that can store voice recognition software executed by the logic device. Although a microphone can be integrated with the portable wireless headset, a microphone can also be located on the player tracking unit, in addition to or in place of the microphone on the portable wireless headset. In particular, the player tracking unit can include a microphone configured to receive voice commands at the player tracking unit.

Communications between the wireless interface device and the portable wireless headset can be one-directional or two-directional, depending on the application. For instance, a one-directional system can include communications to the portable wireless headset from the player tracking unit. In other applications, the portable wireless headset can include a microphone that allows one-directional communications from the portable wireless headset to the player tracking unit. In yet other examples, a two-directional system can allow the player tracking unit to provide communications to the portable wireless headset, and for the portable wireless headset to provide communications to the player tracking unit. In some embodiments, the portable wireless headset can also provide player tracking information to the player tracking unit as described above with regard to portable wireless devices in general.

According to various examples, the wireless interface device 264 may use a wireless communication standard such as Bluetooth™ to communicate with portable wireless devices using this standard although other wireless communication protocols such as IEEE 802.11a, IEEE 802.11b, IEEE 802.11x (e.g. other IEE 802.11 standards), hiperlan/2, HomeRF, and magnet-powered wireless technologies may also be used. Examples of magnet-powered wireless technologies are described in Charney, Ben, "Magnets Attracting Wireless Attention," CNET News.com, Sep. 19, 2003. Bluetooth devices communicate on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface device 264 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com.

In another embodiment of the present invention, the microphone 207 and speaker 209 may be used to input gaming information and aurally communicate gaming information. For instance, the microphone 207 may be used with voice recognition software executed by: a) a logic device on the player tracking unit or b) a master gaming controller in a gaming machine, may be used recognize verbal requests for gaming services. For instance, the player may request a drink by saying "order me a drink" into the microphone 207.

The speaker 209 may be used to aurally communicate gaming information to the player or someone else using the gaming machine. For instance, when a card has been inserted incorrectly in the card reader 225. A message, such as "card not inserted correctly," may be projected from the speaker. Simultaneously, although not required, the light 216 may flash red to draw the players attention. Voice messages from the speaker 209 may be projected in different languages. For example, for a Japanese speaking game player messages may be in Japanese, for a Spanish speaking game player the messages may be in Spanish while for an English speaking player the messages may be in English. The language preferred by the player may be stored as player tracking information on a player tracking card or the player may be able to specify their language using one of the input devices on the player tracking unit. The player tracking information on the player tracking card may be based on a user profile previously established by the player which may be used to select the language used by the player. In some embodiments, a portable wireless headset can be used in place of or in addition to a speaker 209. The same information described above can be transmitted to the portable wireless headset to improve the quality of the communications to the player from the gaming machine.

In general, the same game information may be communication visually, aurally or both visually and aurally. Further, one type of game information may be communicated only aurally while another type of game information may be communicated only visually. For visual communication of game information, combinations of illumination devices in the light 216, the light 211 and the back-lit key pad buttons (e.g. 221, 222 and 223) may be illuminated in different color and light patterns that may vary with time and may last for only a specific duration. For instance, when the gaming machine has been idle for a specific period time some of the lights (e.g. 216 or 211) on the housing 200 may flash in a pattern for a specific amount of time at specific intervals to attract a player's attention. As another example, an error condition detected in the player tracking unit may result in visual response which remains on until the error condition is cleared by an operator. For aural communication of game information, various sounds and verbal message may be projected from a sound projection device such as the speaker 209. These sounds or messages may vary with time and may last for a specific duration of time.

The player tracking housing 200 may be installed in a gaming machine. In response to a game event or bonus game event generated from the game played on the gaming machine, the illumination devices may be illuminated and/or a sound may be projected from the sound projection device. The game event or bonus game event may also be generated from a game played on one or more gaming machines in communication with the gaming machine where the player tracking housing 200 is mounted such as gaming machines connected together around a gaming carousel. In addition, the game event may be generated from a remote gaming device such as player tracking server connected to the gaming machine. For example, all players playing a group of gaming machines (e.g. 25 cent denomination machines) in communication with the remote gaming device may be awarded free credits, free airline miles, or another prize. As another example, in response to a signal generated from a proximity sensor on the player tracking unit, such as an infrared device or a Bluetooth device that is activated when a person is in front of the gaming machine, the illumination devices may be illuminated and/or a sound may be projected from the sound projection device to attract a player's attention.

In particular embodiments, to indicate a status of a card inserted in the card reader 225, the one or more of the illumination devices may illuminated and/or a sound, such as a voice message, may be projected from the sound projection device. The card status may be an invalid card, an abandoned card or an incorrectly inserted card. In addition, the one or more illumination devices may be illuminated and/or a sound may be projected from the sound projection device to indicate 1) a special status of a player, 2) to indicate an amount of credits (e.g., 51, 105, 205, etc.), a range of credits (e.g. 0-100, 101-200, 201-300, etc.) or a level (e.g. 1000 points=level 1, 5000 points=level 2 and win a free jacket, 15,000=level 3 and win a free trip; points may be player tracking points or some other point system) earned by the player during a game play session on the gaming machine, 3) to indicate a service request by the player such as a drink request, 4) to indicate a status of a gaming device located on the gaming machine such as a hopper, a drop door or a printer, 5) a status one or more of the player tracking interface devices located on said player tracking unit, 6) a jackpot is pending and requires a "hand" payout, 7) an error condition has been detected on the gaming machine or the player tracking unit and 8) a special promotion is being offered at a gaming establishment where the player tracking unit is installed. The special promotion may be a live video broadcast, dinner shows, gifts as well as other goods and services. Many different types of gaming information may be visually or aurally communicated using the present invention and is not limited to the examples provided above.

Figure 3:
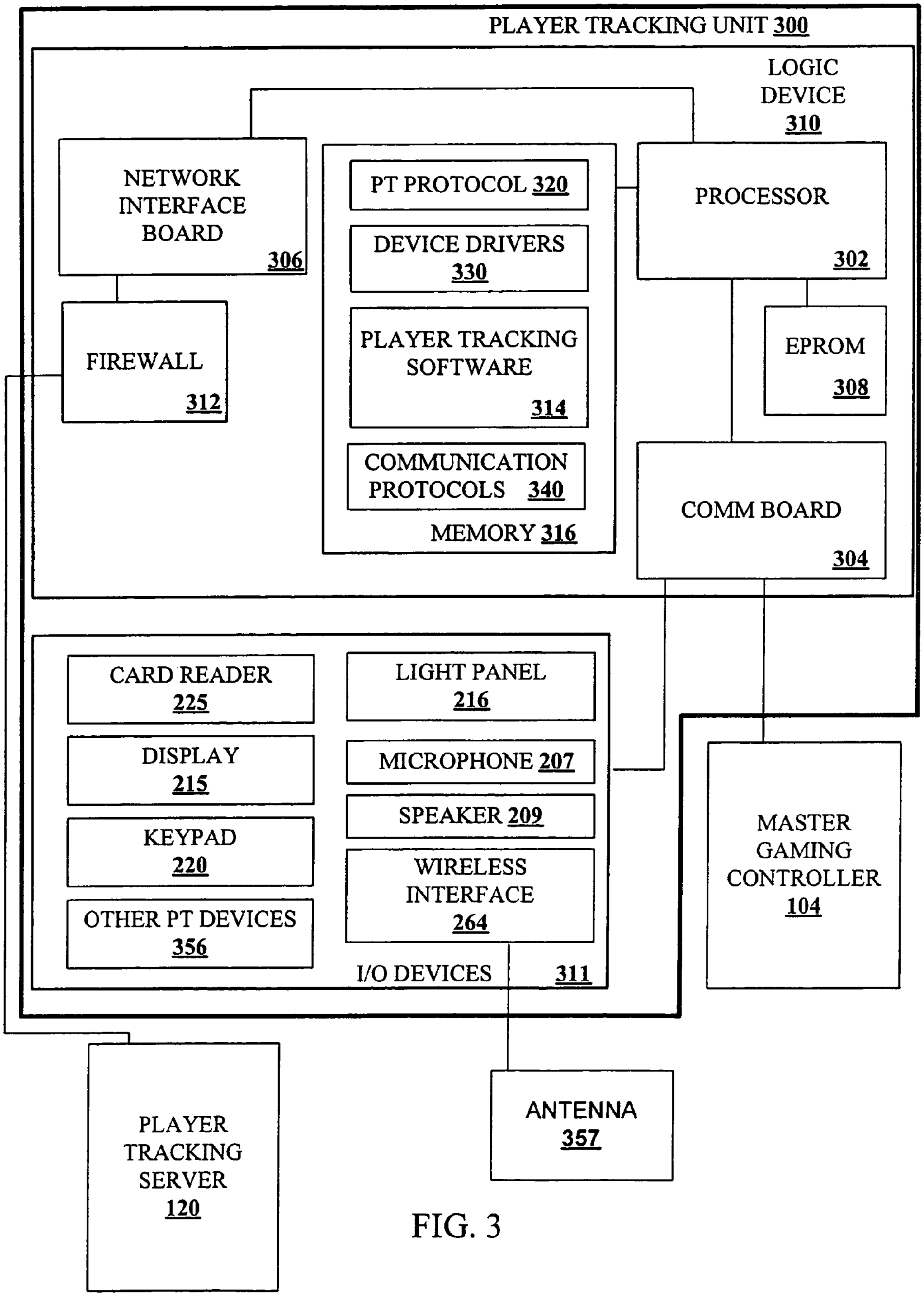
FIG. 3 is a block diagram of the components of a player tracking unit of the present invention.

FIG. 3 is a block diagram of an embodiment of a player tracking unit 300 of the present invention connected to a master gaming controller 104 on a gaming machine and a player tracking server 120. The player tracking unit 300 includes a logic device 310 enclosed in a logic device housing and a number of player tracking interface devices including a card reader 225, a display 215, a key pad 220, a light panel 216, a microphone 207, a speaker 209, a wireless interface and other player tracking interface devices 356 enclosed in a device housing 311. The logic device 310 for the player tracking unit and the player tracking interface devices may be enclosed in a single housing (see FIGS. 2A-2C) or separate housings.

The logic device 310 may include a processor for executing software allowing the player tracking unit to perform various player tracking functions such as communicating with the player tracking server 120, communicating with the master gaming controller 104 or operating the various peripheral devices such as the card reader 225, the display 215, the key pad 220 and the light panel 216. For instance, the logic device 310 may send messages containing player tracking information to the display 215. As another example, the logic device 310 may send commands to the light panel 216 to display a particular light pattern and to the speaker 209 to project a sound to visually and aurally convey game information. The logic device 310 may utilize a microprocessor and/or microcontrollers. For instance, the light panel 216 may include a microcontroller that converts signals from the processor 302 to voltage levels for one or more illumination devices. In one embodiment, application software for the player tracking unit 300 and configuration information for the player tracking unit may be stored in a memory device such as an EPROM 308, a non-volatile memory, hard drive or a flash memory.

The player tracking unit may include a memory 316 configured to store: 1) player tracking software 314 such as data collection software, 2) player tracking communication protocols (e.g.320) allowing the player tracking unit 300 to communicate with different types of player tracking servers, 3) device drivers for many types of player tracking interface devices (e.g. 330 ), 4) voice recognition software for receiving voice commands from the microphone 207, 5) a secondary memory storage device such as a non-volatile memory device, configured to store gaming software related information (The gaming software related information and memory may be used in a game download process or other software download process.), and 6) communication transport protocols (e.g. 340) such as TCP/IP, USB, Firewire, IEEE 1394, Bluetooth, IEEE 802.11a, IEEE 802.11b, IEEE 802.11x (e.g. other IEEE 802.11 standards), hiperlan/2, HomeRF, and magnet-powered wireless technology standards, allowing the player tracking unit to communicate with devices using these protocols or communication protocols allowing the logic device to communicate with different types of master gaming controllers (e.g. master gaming controllers using different types of communication protocols), such as 104. Typically, the master gaming controller, such as 104, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316 for each type of player tracking device. For example, device drivers for five different types of card readers, six different types of displays and 8 different types of key pads may be stored in the memory 316. When one type of a particular peripheral device is exchanged for another type of the particular device, a new device driver may be loaded from the memory 316 by the processor 302 to allow communication with the device. For instance, one type of card reader in the player tracking unit 300 may be replaced with a second type of card reader where device drivers for both card readers are stored in the memory 316.

In some embodiments, the software units stored in the memory 316 may be upgraded as needed. For instance, when the memory 316 is a hard drive, new device drivers or new communication protocols may be uploaded to the memory from the master gaming controller 104, the player tracking server 120 or from some other external device. As another example, when the memory 316 is a CD/DVD drive containing a CD/DVD designed or configured to store the player tracking software 314, the device drivers and other communication protocols, the software stored in the memory may be upgraded by replacing a first CD/DVD with a second CD/DVD. In yet another example, when the memory 316 uses one or more flash memory units designed or configured to store the player tracking software 314, the device drivers and other communication protocols, the software stored in the flash memory units may be upgraded by replacing one or more flash memory units with new flash memory units storing the upgraded software. In another embodiment, one or more of the memory devices, such as the hard-drive, may be employed in a game software or player tracking software download process from a remote software server.

In one embodiment of the present invention, a minimal set of player tracking software applications 314, communication protocols 340, player tracking communication protocols and device drivers may be stored on in the memory 316. For instance, an operating system, a communication protocol allowing the player tracking unit 300 to communicate with a remote server such as the player tracking server 120 and one or more common player tracking applications may be stored in memory 316. When the player tracking unit is powered-up, the player tracking unit 300 may contact a remote server 120 and download specific player tracking software from the remote software. The downloaded software may include but is not limited to one or more particular player tracking applications that are supported by the remote server, particular device drivers, player tracking software upgrades, and a particular communication protocol supported by the remote server. Details of this method are described in co-pending U.S. application Ser. No. 09/838,033, filed on Mar. 19, 2001, by Criss-Puskiewicz, et al., entitled, "UNIVERSAL PLAYER TRACKING SYSTEM," which is incorporated herein in its entirety and all for purposes In some embodiments, the player tracking functions may be implemented by both the logic device 310 and the master gaming controller 104. For instance, the master gaming controller may execute voice recognition software to interpret voice commands input from the microphone 207 or from a microphone included with a portable wireless headset. Thus, player tracking software such as the player tracking protocols may be stored on a memory located on the gaming machine which is separate from the player tracking unit. In some embodiments, the player tracking software stored on the memory on the gaming machine may be executed by the master gaming controller 104 on the gaming machine in other embodiments, the player tracking software stored on the memory on the gaming machine may be executed by the logic device 310 on the player tracking unit.

The logic device 310 includes a network interface board 306 configured or designed to allow communication between the player tracking unit 300 and other remote devices such as the player tracking server residing on local area networks, such as a casino area network, a personal area network such as a piconet (e.g. using Bluetooth), or a wide area network such as the Internet. The network interface board 306 may allow wireless or wired communication with the remote devices. The network interface board may be connected to a firewall 312. The firewall may be hardware, software or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 304 may be configured to allow communication between the logic device 310 and the player tracking interface devices including 225, 215, 220, 216, 207, 209 and 356 and to allow communication between the logic device 310 and the master gaming controller 104. The wireless interface 264 may be used to allow the player tracking unit and possibly the master gaming controller 104 to communicate with portable wireless devices or stationary devices using a wireless communication standard. The wireless interface 264 may be connected to an antenna 357. In some embodiments, the wireless interface 264 may be incorporated into the communication board 304. In addition, in some embodiments, the logic device 310 and the master gaming controller 104 may communicate using a non-proprietary standard wireless communication protocol such as Bluetooth, IEEE 802.11a, IEE 802.11b, IEEE 802.11x (e.g. other IEEE 802.11 standards), hiperlan/2, HomeRF, a magnet-powered wireless technology protocol, or using a non-proprietary standard wired communication protocol such as USB, Firewire, IEEE 1394 and the like. In the past, gaming machines have primarily used proprietary standards for communications between gaming devices. In other embodiments, the logic device 310 and the master gaming controller may communicate using a proprietary communication protocol used by the manufacturer of the gaming machine.

The communication between the player tracking unit 300 and 1) the player tracking interface devices, 2) the master gaming controller 104, 3) the player tracking server 120 and 4) any other external or internal gaming devices may be encrypted. In one embodiment, the logic device 310 may poll the player tracking interface devices for information. For instance, the logic device 310 may poll the card reader 225 to determine when a card has been inserted into the card reader or may poll the key pad 220 to determine when a button key has been depressed. In some embodiments, the player tracking interface devices may contact the logic device 310 when a player tracking event such as a card being inserted into the card reader has occurred.

The logic device 310 may poll the master gaming controller 104 for game usage information. For instance, the logic device 310 may send a message to the master gaming controller 104 such as "coin-in". The master gaming controller may respond to the "coin-in" message with an amount when credits are registered on the gaming machine.

The logic device 310, using an appropriate device driver, may send instructions to the various player tracking interface devices to perform specific operations. For instance, after a card has been inserted into the card reader 225, the processor logic device may send a "read card" instruction to the card reader, a "display message A" instruction to the display 215 and a "good luck" voice message to speaker 209. In addition, the logic device 310 may be configured to allow the master gaming controller 104 to send instructions to the player tracking interface devices via the logic device 310. As an example, after a card has been inserted into the card reader 225, the processor logic 310 may determine that the card is for a gaming application controlled by the master gaming controller 204 and send a message to the master gaming controller 104 indicating a card has been inserted into the card reader. In response, to the message from the logic device, the master gaming controller 104 may send a series of commands to the player tracking interface devices such as a "read card" instruction to the card reader 225, a flash light pattern "A" command to the light panel 216, and a "display message" instruction to the display 215 via the logic device 310. The instructions from the master gaming controller 104 to the player tracking interface devices may be obtained from gaming application software executed by the master gaming controller 104. The gaming application software may or may not be related to player tracking services.

The player tracking unit 300 may include one or more standard peripheral communication connections (not shown). The logic device 310 may be designed or configured to communicate with the master gaming controller 104 and the player tracking interface devices using a standard peripheral connection, such as an USB connector, and using a standard communication protocol, such as USB. The USB standard allows for a number of standard USB connectors that may be used with the present invention. The player tracking unit 300 may contain a hub connected to the peripheral communication connection and containing a plurality of peripheral communication connections. Details of using a standard peripheral communication connection are described in co-pending U.S. Pat. No. 6,251,014, issued Jun. 26, 2001, by Stockdale, et al., entitled, "STANDARD PERIPHERAL COMMUNICATION," which is incorporated herein in its entirety and for all purposes.

Figure 1:
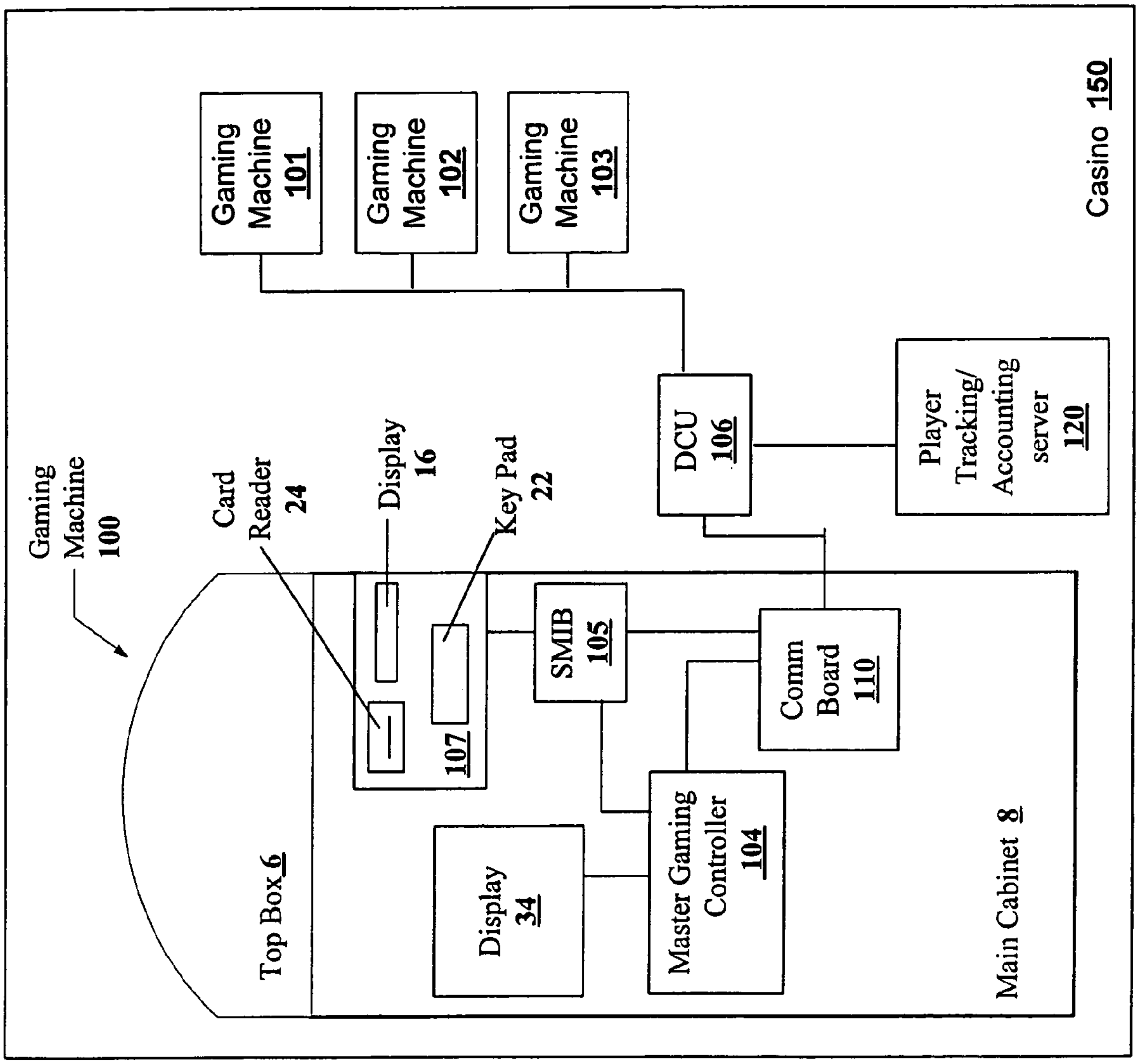
FIG. 1 is a block diagram of a number of gaming machines with player tracking units connected to servers providing player tracking services.
Figure 4:
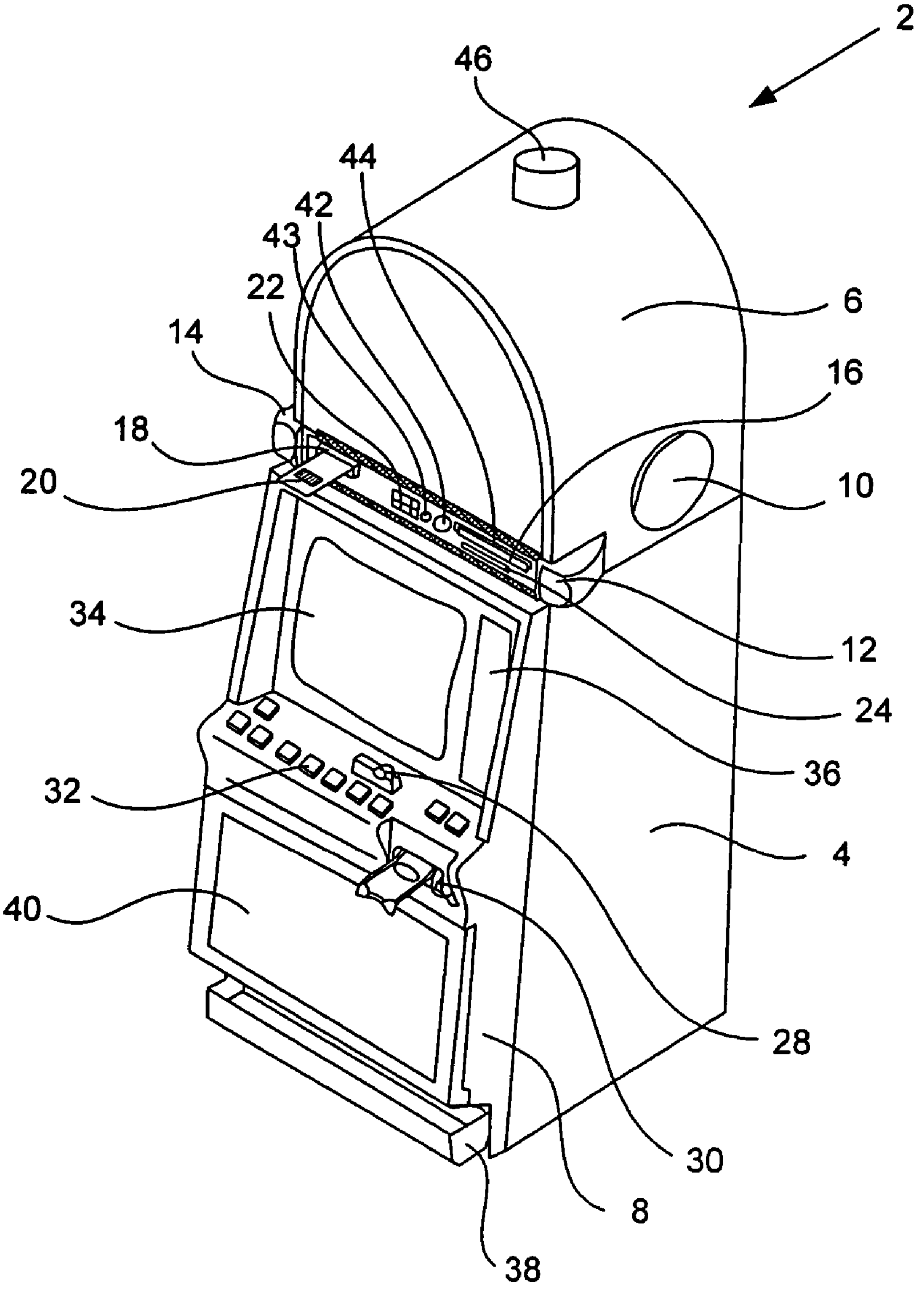
FIG. 4 is a perspective drawing of a video gaming machine of the present invention.

Turning to FIG. 4, more details of using a player tracking system in the context of game play on a gaming machine are described. In FIG. 4, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 1) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. A player playing a game on the gaming machine 2 or a person near the gaming machine may view the light patterns from the light panel 216. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting their card, the player may be visually prompted on the display screen 16 or aurally prompted using the speaker to enter identification information such as a PIN code using the key pad 22. Typically, the player tracking card may remain in the card reader 24 during the game play session. As another example, the gaming machine may transfer player tracking information from a portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or "comps" for the player such as free meals or free rooms. Usually, the player tracking card inserted into the card reader contains at least player tracking account information. When the card is inserted correctly into the card reader 24, the information stored on the card, such as the player's account information, may be read by the card reader and transferred by a logic device on the player tracking unit (see FIG. 3) to the player tracking server. The player tracking account information allows the player tracking server to store player tracking points accumulated during the game-play session to the appropriate account. When player tracking information is not provided by the player, for instance, when the player tracking card has been inserted incorrectly into the card reader 24, player tracking points are not accumulated.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services. In addition, when the player has inserted a player tracking card in the card reader to initiate a player tracking session, to prevent the player from leaving or "abandoning" their card in the card reader 24, a voice message, such as "please remove your card," may be projected from the sound projection device 44.

Figure 5:
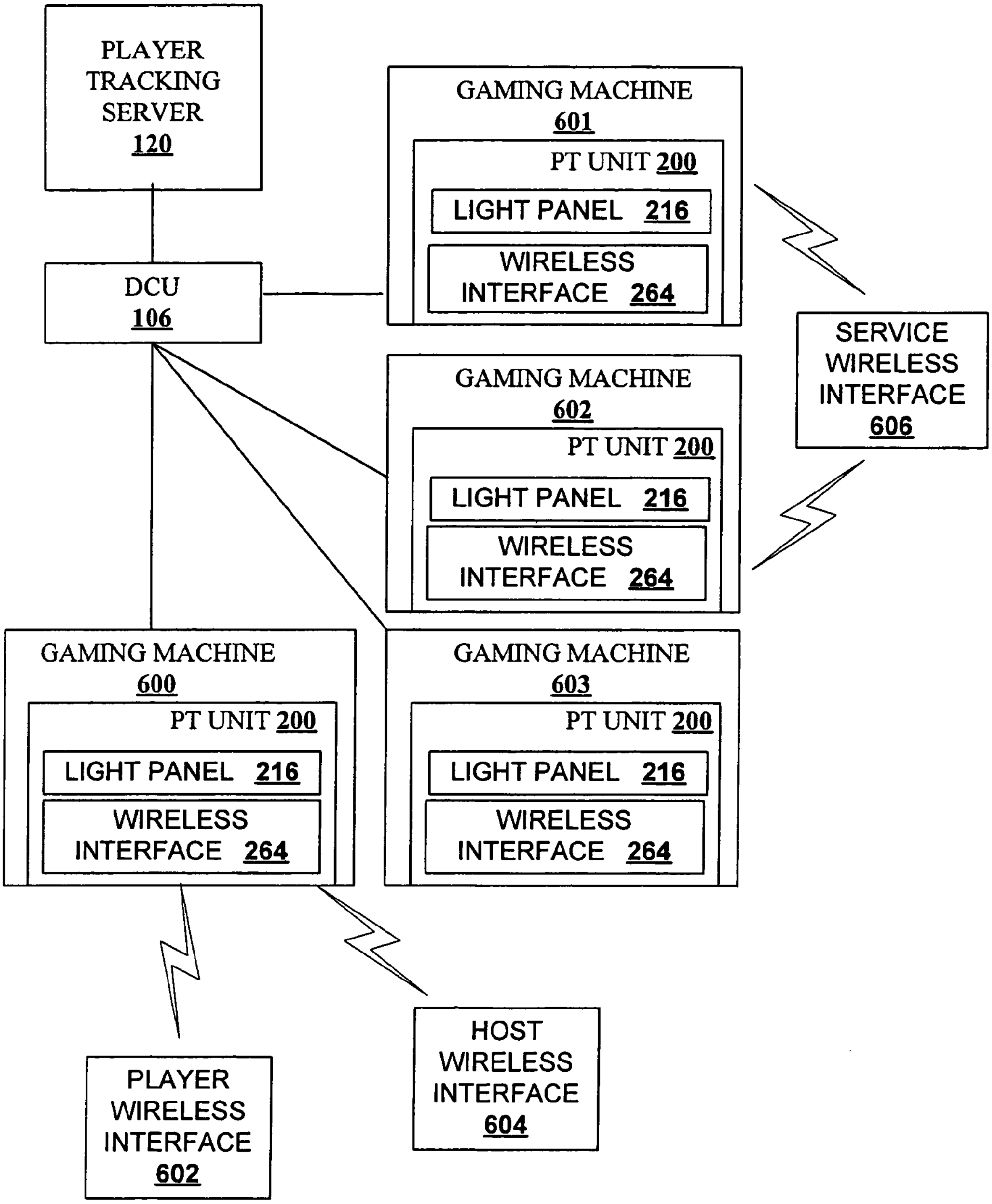
FIG. 5 is a block diagram of a number of gaming machines each with a player tracking unit connected in a player tracking system where the player tracking units use illumination devices and wireless interface devices to convey gaming information.

FIG. 5 is a block diagram of a number of gaming machines each with a player tracking unit connected in a player tracking system where the player tracking units utilize light panels and wireless interface devices to communicate gaming information. Four gaming machines 600, 601, 602 and 603 each with a player tracking unit 200, a light panel 216 and a wireless interface 264 are connected to the player tracking server 120 via the data collection unit 106. As described with respect to FIG. 2, the light panels 216 may be used to visually communicate gaming information to an interested parties, such as a game player, a casino service representative, or a maintenance technician. The wireless interface devices 264 may be used to communicate gaming information to a portable wireless devices carried by different individuals such as game players, casino service representatives or a maintenance technician. As described above, wireless communication standard such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, HomeRF, or a magnet-powered wireless technology standard, may be used to provide communications between the wireless interface device 264 and a portable wireless interface device.

The portable wireless devices carried by different individuals may be designed or configured to selectively establish communications with the player tracking units 200 broadcasting various messages via the wireless interfaces 264. For instance, a service wireless interface device 606 may be designed or configured to only establish communications with a player tracking unit when the unit is broadcasting a maintenance request message. Thus, when the service wireless interface device 606 receives another type of message, such as a message indicating a player has requested a drink, the device will ignore the message and not establish communications with the player tracking unit broadcasting that message. In another example, the host wireless interface device 604 may only establish communications with one of the player tracking units 200 when the player tracking unit has determined that a game player with "special" status is at their machine and then, sent a message indicating the status of the player to the host wireless interface device 604.

In one embodiment, a maintenance technician may carry a portable wireless interface device 606 used for service of a player tracking unit or a gaming machine. A light panel 216 on gaming machine 602 may display a message such as a flashing red light indicating the gaming machine or the player tracking unit requires service. The maintenance technician may see the flashing red light and approach the machine. As the maintenance technician approaches the gaming machine 602 carrying the service wireless interface device 606, in response to a maintenance request message broadcast via wireless interface 264 on gaming machine 602, the service wireless interface device may establish wireless communications with the gaming machine 602. In one embodiment, the service wireless interface device may be a personal digital assistant. The service wireless interface device may also receive broadcast messages from gaming machines 600, 601 and 603. However, unless these other gaming machines are also broadcasting a maintenance request message, the service wireless interface device 606 will not establish communications with these gaming machines. After establishing communications with gaming machine 602, the service wireless interface device 606 may receive information regarding the nature of the maintenance service request. For instance, an interface such as a display screen on the device 606 may display a message indicating a hopper needs to filled, a ticket tray needs to be filled or a gaming device is operating incorrectly. Based upon the information displayed on the wireless interface device 606, the maintenance technician may take an appropriate action such as filling the hopper.

In another embodiment, a casino service representative may wear a portable wireless device, such as a watch with colored lights. The colored lights on the watch may be used to indicate the status of the player. For example, using a portable wireless interface device 602, the player may have established a player tracking session on gaming machine 600. When the casino service representative is within range of the wireless interface device 264 on gaming machine 600, such as walking by the player playing a game on a gaming machine, a light on their watch may flash green to indicate the player is a special customer. The light mechanism on their watch may be activated in response to gaming information received from the wireless interface device 264. The rate of flashing may increase as the casino service representative approaches the player so that the casino service representative can select the correct player if a number of players are playing nearby. The gaming information included in a message broadcast from gaming machine 600 may also indicate a location of the player such as a machine number where they are playing. Thus, a message may be displayed on a visual interface on the watch, such as "go to machine 600." The casino service representative may then offer the special customer one or more services according to their "status" as determined by the casino.

In another example, a portable wireless device carried by the casino service representative may include an audio interface of some type such as an ear-piece inserted in their ear. When the casino service representative is within range of the wireless interface device 264, the representative may hear message in response to gaming information received from the wireless interface 264, such as, "Jane Doe at gaming machine 600 is a special customer and likes drink A." The casino service representative may then respond to the message by asking the player if they would like a drink such as "drink A".

An advantage of using a wireless interface to communicate gaming information, such as a player's status, to a casino service representative, over using a signaling means such as a light on the player tracking unit is that individuals other than casino personnel are less likely to be able to determines the player's status. When anyone can easily discern the signaling means used to indicate the player's status, it may draw undesired attention to the player. For instance, an easily discernable signaling means may increase the special player's chances of becoming a theft target.

In another example, a portable wireless device can be a portable wireless headset as described above in more detail with regard to FIG. 2C. The portable wireless headset can serve as an audio interface such as an ear-piece, a set of ear-pieces, or the like. Furthermore, as also described above, the portable wireless headset can include a microphone in some embodiments. This portable wireless headset can be used for one- or two-way communications between a player and a casino employee, between the player and a gaming machine, between a first player and a second player or between the player and another remote person. The communications may be implemented from the headset directly to another headset, from the headset via the gaming machine to another device or in combination with any other available communication means.

In one embodiment, a unique ID may be assigned to each headset. A unique identification number can be implemented on a controller by adding a chip, such as the DS2401: Silicon Serial number chip from Dallas Semiconductor (Dallas, Tex.). The unique headset ID may be mapped to the person's ID wearing the headset. For example, when a person logs into a player tracking system and is wearing the headset, the player tracking system may receive and authenticate a player's identity and may also establish communications with the player's headset. The unique headset ID may be received from the headset and associated with player from their player tracking information. Further, the headset may be used to allow the player tracking unit to communicate with multiple headsets simultaneously and provide common or different messages to each of the headsets in communication with the player tracking unit.

In another embodiment, when a headset is checked out, the headset ID number may be registered to the player. Later, the headset may be returned and assigned to another player. Using the unique headset ID number, a targeted message may be sent to an individual or to a group of players via their headsets. For example, a security alert may be broadcast to a selective group, such as casino floor security personnel or a security alert could be broadcast to all users wearing headsets. In another example, an emergency message may be sent to a particular individual via their headset.

One benefit of using a portable wireless headset to communicate gaming information between a player and a gaming machine is that individuals other than the person are less likely to be able to hear personal reminders, promotions, etc. that may be specific to the person. This information, which can be stored in a player tracking account, may be personal to the player, and a player may not wish this information to be broadcast over a gaming machine's speakers. For instance, a player may not want others to know about a dinner reservation that he or she has made at a particular place for a particular time. Accordingly, such a portable wireless headset can provide improved privacy for players.

Figure 6:
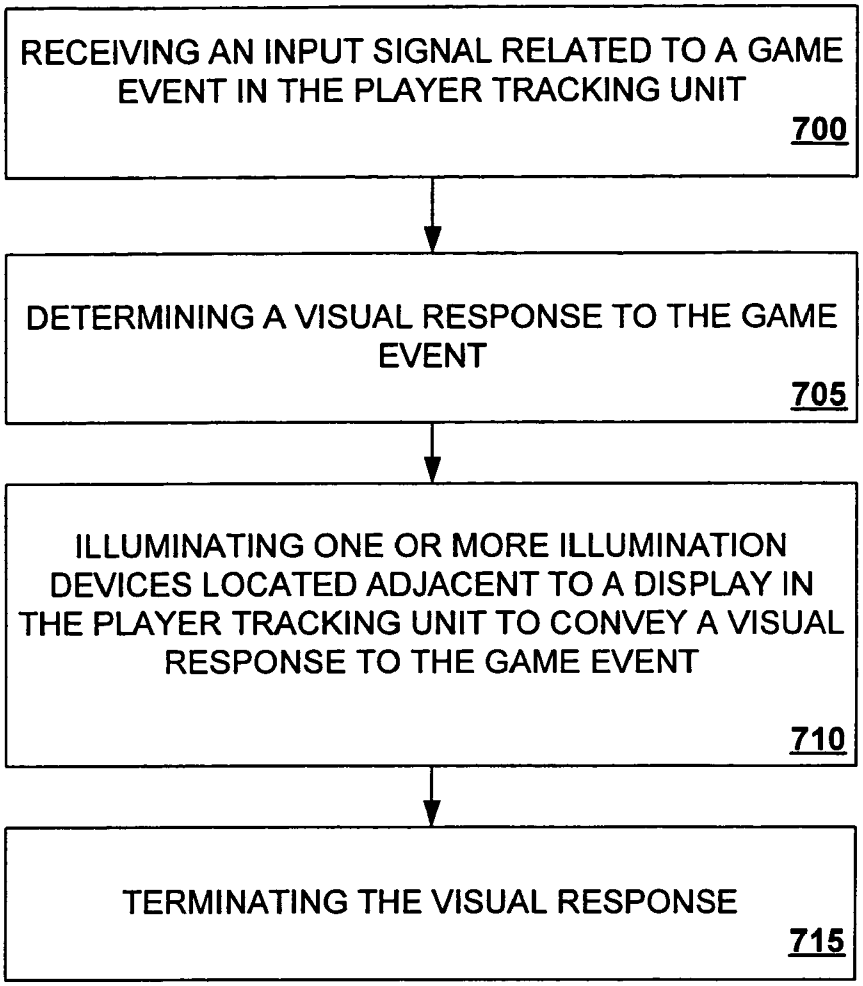
FIG. 6 is a flow chart of a method for visually providing gaming information on a gaming machine.

FIG. 6 is a flow chart of a method for visually providing gaming information on a gaming machine. In 700, an input signal relating to a game event is received by a logic device on the player tracking unit. The input signal may be from but is not limited a gaming machine, a player tracking server, an external device such as a portable wireless device and one or more player tracking interface devices located on the player tracking unit. The input signal may contain gaming information specifying a type of event. For instance, the message the input signal may contain information indicating a player tracking card has been inserted incorrectly. In 705, the player tracking unit may determine a visual and/or aural response to the game event. One response to the game event may be no response. The visual response may be a light pattern to be implemented on one or more illumination devices located on the player tracking unit, such as adjacent to the display. An aural response may be sound or a voice message that will be projected from a sound projection device located on the player tracking unit. A duration of the visual response or aural response may be determined. The visual response and aural response may be repeated for a fixed duration of time. For example, an illumination device may be flashed for 10 seconds or an illumination device may remain illuminated in until an error condition is cleared.

In 710, one or more illumination devices, such as illumination devices adjacent to a display, near a card reader, behind a back-lit key pad and combinations thereof, may be illuminated to convey a visual response to the game event. Also, a sound may be projected from a sound projection device, such as speaker, to convey an aural response to the game event. In 715, in response to a second event, such as the duration of the visual response or aural response ending or an error condition being cleared, the visual response or aural response is terminated. For instance, a player may insert a player tracking card incorrectly and receive a visual response or aural response from the player tracking unit. Then, the player may remove the card and then the visual response or aural response to the incorrectly inserted card may be terminated.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine may be provided without a top box or the gaming machine may be of a slant-top or table top design.

What is claimed is:

1. A player tracking unit comprising:

a display;

a wireless interface device designed or configured to communicate with a portable wireless headset; and a logic device designed or configured to communicate with the display, the wireless interface device, a master gaming controller that controls a game played on a gaming machine and a player tracking server, wherein the logic device is designed or configured to communicate with the portable wireless headset using the wireless interface device when the portable wireless headset comes in proximity to the player tracking unit, said communication comprising messages on information associated with a player tracking account.

2. The player tracking unit of claim 1, wherein the portable wireless headset is worn by a game player.

3. The player tracking unit of claim 1, wherein the portable wireless headset includes one or more ear pieces configured to be worn by a player.

4. The player tracking unit of claim 1, wherein the portable wireless headset includes a noise cancellation feature, wherein the noise cancellation feature is configured to reduce the amount of ambient noise detectable when the portable wireless headset is used.

5. The player tracking unit of claim 1, wherein the portable wireless headset includes an unique identification number for allowing the portable wireless headset to be associated with a particular user.

6. The player tracking unit of claim 1, wherein the portable wireless headset is designed to receive a message that is broadcast to a group of portable wireless headsets or sent only to the portable wireless headset.

7. The player tracking unit of claim 1, wherein the player tracking unit is configured to send security alerts to the portable wireless headset via the wireless interface device.

8. The player tracking unit of claim 1, wherein the player tracking unit is configured to send messages of reminders, messages of special offers, or messages of promotions.

9. The player tracking unit of claim 1, wherein the player tracking unit is configured to transmit music to the portable wireless headset via the wireless interface device, such that a player can listen to music when in proximity to the player tracking unit.

10. The player tracking unit of claim 1, wherein the portable wireless headset includes a microphone, wherein the portable wireless headset is configured to transmit data received by the microphone to the wireless interface device, and wherein the logic device is designed or configured to recognize and execute voice commands for actions based on information associated with said player's player tracking account received from the microphone via the wireless interface device.

11. The player tracking unit of claim 1, further comprising a microphone configured to receive voice commands at the player tracking unit, and wherein the logic device is designed or configured to recognize and execute voice commands input using the microphone.

12. The player tracking unit of claim 1, wherein the player tracking unit communicates with the portable wireless headset using a wireless communication standard selected from the group consisting of Bluetooth, IEEE 802.11a, IEE802.11b, IEEE 802.11x, hiperlan/2, HomeRF, and magnet-powered wireless technology.

13. The player tracking unit of claim 1, wherein the logic device is designed or configured to communicate with the one or more player tracking interface devices using at least one of a USB communication standard, an IEEE 1394 communication standard, a Firewire communication standard, or a magnet-powered wireless technology standard.

14. The player tracking unit of claim 1, further comprising an antenna for transmitting and receiving wireless communications via the wireless interface device.

15. The player tracking unit of claim 1, wherein the player tracking unit is designed to communicate with multiple portable wireless headsets simultaneously.

16. The player tracking unit of claim 8, wherein the reminders, special offers, or promotions are based on information associated with a player tracking account.

17. The player tracking unit of claim 10, further comprising:

a memory designed or configured to store voice recognition software executed by the logic device.

18. A gaming machine comprising:

a master gaming controller designed or configured to control one or more games played on the gaming machine; and a player tracking unit, the player tracking unit comprising:

a display;

a wireless interface device designed or configured to communicate with a portable wireless headset; and a logic device designed or configured to communicate with the display, the wireless interface device, the master gaming controller, and a player tracking server, wherein the logic device is designed or configured to communicate with the portable wireless headset using the wireless interface device when the portable wireless headset comes in proximity to the player tracking unit, said communication comprising messages based on information associated with a player tracking account.

19. The gaming machine of claim 18, wherein the portable wireless headset is worn by a game player.

20. The gaming machine of claim 18, wherein the portable wireless headset includes one or more ear pieces configured to be worn by a player.

21. The gaming machine of claim 18, wherein the portable wireless headset includes a noise cancellation feature, wherein the noise cancellation feature is configured to reduce the amount of ambient noise detectable when the portable wireless headset is used.

22. The gaming machine of claim 18, wherein the portable wireless headset includes an unique identification number for allowing the portable wireless headset to be associated with a particular user.

23. The gaming machine of claim 18, wherein the portable wireless headset is designed to receive a message that is broadcast to a group of portable wireless headsets or sent only to the portable wireless headset.

24. The gaming machine of claim 18, wherein the player tracking unit is configured to send security alerts to the portable wireless headset via the wireless interface device.

25. The gaming machine of claim 18, wherein the messages include reminders, special offers, or promotions.

26. The gaming machine of claim 18, wherein the player tracking unit is configured to transmit music to the portable wireless headset via the wireless interface device, such that a player can listen to music when in proximity to the player tracking unit.

27. The gaming machine of claim 18, wherein the portable wireless headset includes a microphone, wherein the portable wireless headset is configured to transmit data received by the microphone to the wireless interface device, and wherein the logic device is designed or configured to recognize and execute voice commands for actions based on information associated with said player's player tracking account received from the microphone via the wireless interface device.

28. The gaming machine of claim 18, further comprising a microphone configured to receive voice commands at the player tracking unit, and wherein the logic device is designed or configured to recognize and execute voice commands input using the microphone.

29. The gaming machine of claim 18, wherein the player tracking unit communicates with a portable wireless device using a wireless communication standard selected from the group consisting of Bluetooth, IEEE 802.11a, IEE802.11b, IEEE 802.11x, hiperlan/2, HomeRF, and magnet-powered wireless technology.

30. The gaming machine of claim 18, wherein the logic device is designed or configured to communicate with the one or more player tracking interface devices using at least one of a USB communication standard, an IEEE 1394 communication standard, a Firewire communication standard, or a magnet-powered wireless technology standard.

31. The gaming machine of claim 18, further comprising an antenna for transmitting and receiving wireless communications via the wireless interface device.

32. The gaming machine of claim 18, wherein the one or more games is selected from the group consisting of video slot games, mechanical slot games, video black jack games, video poker games, video keno games, video pachinko games, video card games, video games of chance, and combinations thereof.

33. The gaming machine of claim 18, wherein the player tracking unit is designed to communicate with multiple portable wireless headsets simultaneously.

34. The gaming machine of claim 24, further comprising:

a memory designed or configured to store voice recognition software executed by the logic device.

35. The gaming machine of claim 25, wherein the reminders, special offers, or promotions are based on information associated with a player tracking account.

36. A player tracking system comprising:

a player tracking server;

a plurality of gaming machines, the gaming machines each comprising:

a master gaming controller designed or configured to control one or more games played on the gaming machine; and a player tracking unit, the player tracking unit comprising:

a display;

a wireless interface device designed or configured to communicate with a portable wireless headset; and a logic device designed or configured to communicate with the display, the wireless interface device, the master gaming controller, and the player tracking server, wherein the logic device is designed or configured to communicate with the portable wireless device using the wireless interface device when the portable wireless headset comes in proximity to the player tracking unit, said communication comprising messages based on information associated with a player tracking account; and a network designed or configured to allow communication among the plurality of gaming machines and the player tracking server.

* * * * *